United States Patent

Arai et al.

Patent Number: 5,510,009
Date of Patent: Apr. 23, 1996

[54] ELECTROLYZED WATER PRODUCING METHOD AND APPARATUS

[75] Inventors: Kazuyoshi Arai, Atsugi; Ichiro Shoda, Isehara; Naoshi Kohno, Atsugi; Takayuki Sato, Hadano; Yoko Okamoto, Hiratsuka, all of Japan

[73] Assignee: Miz Co., Ltd., Kanagawa, Japan

[21] Appl. No.: 283,286

[22] Filed: Jul. 29, 1994

[51] Int. Cl.⁶ .................................................. C02F 1/461
[52] U.S. Cl. .................. 205/746; 204/229; 204/263; 204/275; 205/759; 205/743
[58] Field of Search ............................ 204/149, 151, 204/229, 263, 275

[56] References Cited

U.S. PATENT DOCUMENTS

| | | | |
|---|---|---|---|
| 4,289,599 | 9/1981 | Fushihara | 204/275 |
| 4,671,863 | 6/1987 | Tejeda | 204/266 |
| 4,867,856 | 9/1989 | Okazaki | 204/228 |
| 5,055,170 | 10/1991 | Saito | 204/228 |
| 5,234,563 | 8/1993 | Arai et al. | 204/229 |
| 5,374,341 | 12/1994 | Aoki et al. | 204/229 |

FOREIGN PATENT DOCUMENTS

| | | |
|---|---|---|
| 0396107 | 11/1990 | European Pat. Off. . |
| 3131385 | 6/1991 | Japan . |
| 6047378 | 2/1994 | Japan . |
| 1173258 | 12/1969 | United Kingdom . |

*Primary Examiner*—Arun S. Phasge
*Attorney, Agent, or Firm*—Woodcock Washburn Kurtz Mackiewicz & Norris

[57] ABSTRACT

In a batch type electrolyzed water producing method, a first run of electrolysis is carried out, and electrolyzed water is discharged. Thereafter, before a next run of electrolysis is carried out, the polarity of a DC power source connected to the electrode plates is reversed. Thus, the electrode plate which has served as a cathode plate in the last run of electrolysis is converted into an anode plate and therefore, deposits accumulated on the electrode plate are ionized and dissolved into the subject water.

6 Claims, 12 Drawing Sheets

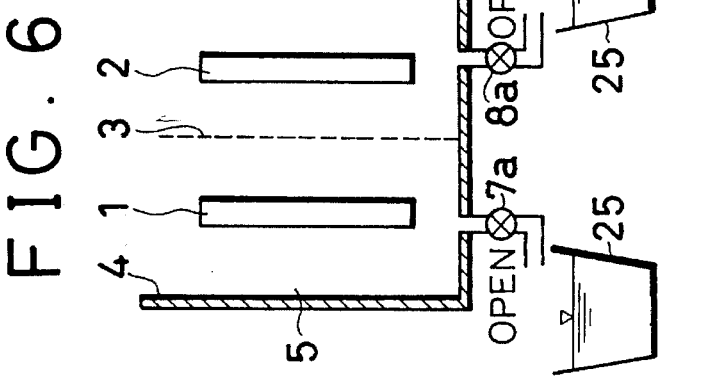
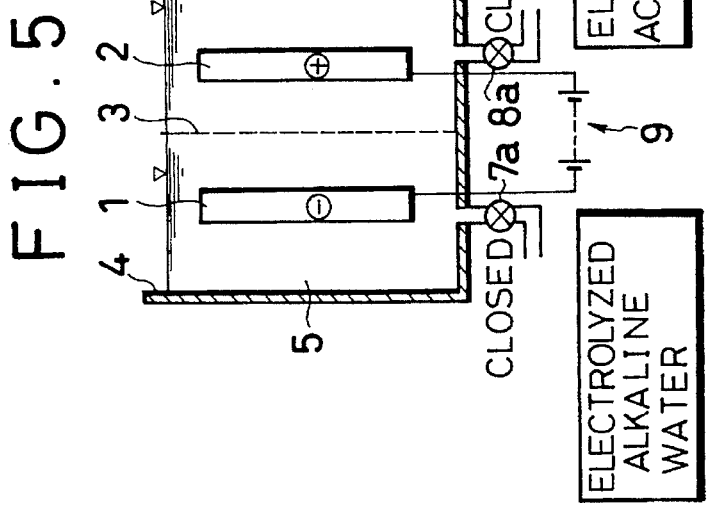
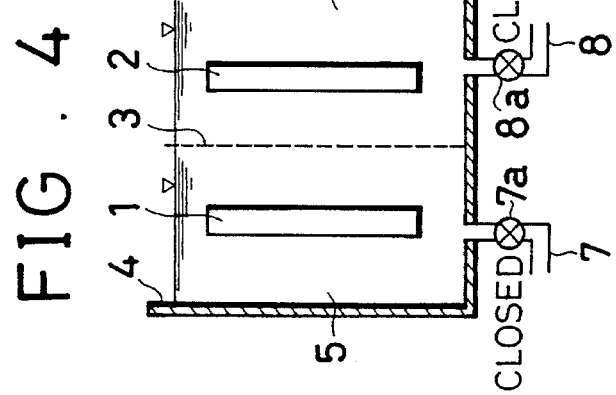

FIG. 9
FIG. 10
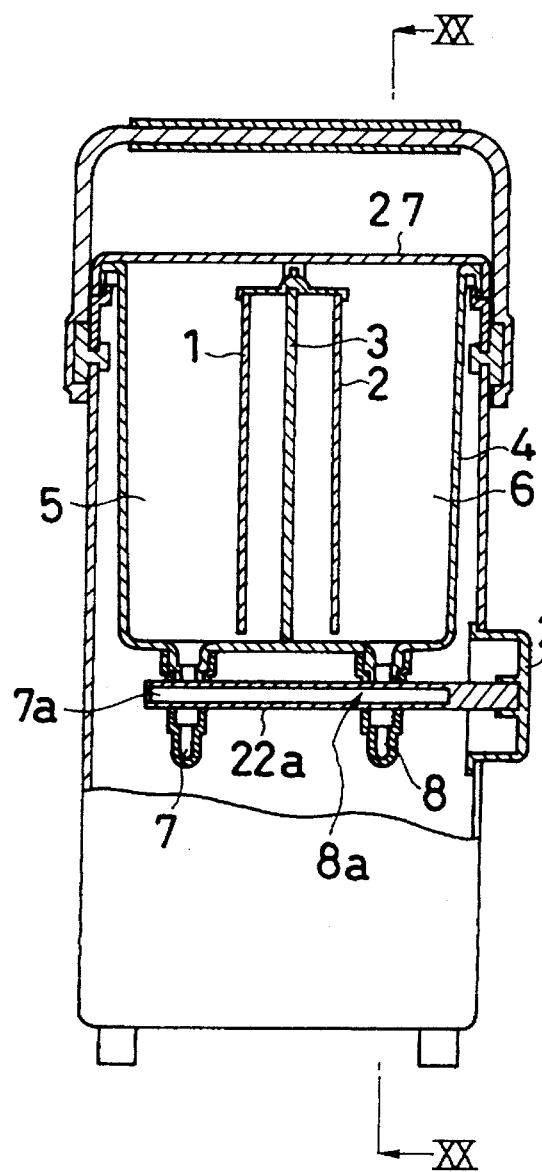
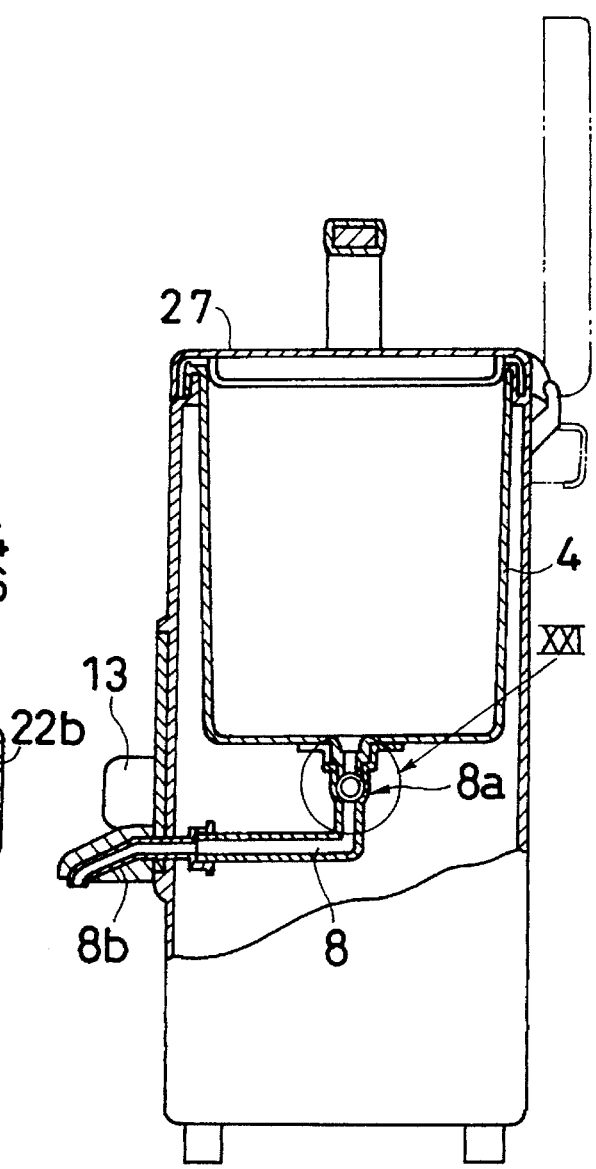

ELECTROLYZED WATER PRODUCING METHOD AND APPARATUS

BACKGROUND OF THE INVENTION

1. Field of the Invention

The present invention relates to method of producing electrolyzed water and apparatus for producing electrolyzed acidic water and electrolyzed alkaline water by electrolyzing water to be electrolyzed (which will be referred to as subject water hereinafter), and particularly to batch type electrolyzed water producing method and apparatus.

2. Description of the Related Art

In the electrolyzed water producing apparatus of this type, when subject water such as city water is supplied into an electrolytic cell, and DC current is supplied to between electrode plates, the electrolysis of the subject water is carried out in the electrolytic cell. Thus, cations such as calcium, sodium, magnesium and potassium ions contained (or intentionally added) in the city water are collected toward a cathode, i.e., into a cathode chamber. On the other hand, anions such as chlorine ion contained in the city water is collected toward an anode, i.e., into an anode chamber. During this time, because the anode and cathode chambers are partitioned by a membrane, only the electrolyzed acidic water is discharged through an outlet port provided in the anode chamber, and only the electrolyzed alkaline water is discharged through an outlet port provided in the cathode chamber.

The prior art electrolyzed water producing apparatus are classified into a continuous type one and a batch type one. The continuous type one is designed so that the subject water is electrolyzed while being continuously supplied to the electrolytic cell, and electrolyzed water is continuously supplied. On the other hand, batch type one is designed so that the subject water is temporarily accumulated in the electrolytic cell and then electrolyzed therein, and resulting electrolyzed water is supplied.

From the viewpoint that the electrolyzed water can be continuously supplied, the continuous type electrolyzed water producing apparatus is superior to the batch type one. However, if electrolyzed strongly acidic water or electrolyzed strongly alkaline water is intended to be continuously produced using the continuous type electrolyzed water producing apparatus, a large number of electrode plates are required from the relationship between the flow rate and the area of the electrode plate. This causes a disadvantage of an increased cost for the electrolyzed water producing apparatus.

In the continuous type electrolyzed water producing apparatus, the internal pressure in the electrolytic cell is increased. Therefore, in order to withstand such an internal pressure, the seal structure for the electrolytic cell is complicated, and/or the number of joint parts such as valves or the like is increased. Thereupon, an inexpensive batch type electrolyzed water producing apparatus is employed in many cases depending upon applications.

In the prior art batch type electrolyzed water producing apparatus, however, there is a problem that cations such as calcium and magnesium ions are deposited on the cathode plate upon electrolysis, and these deposits become scales to reduce the electrolyzing capability. For this reason, it is necessary to periodically replace the cathode plate by new one, and a user must always pay attention to take the frequency of replacement of the cathode plate. If the replacement is defaulted, electrolyzed water having a desired pH value is failed to be produced. Moreover, the proportion of cost occupied by the electrode plates in the electrolyzed water producing apparatus is extremely large, and handling of such expensive electrode plates as expendables has arrested the spread of the electrolyzed water producing apparatus.

The prior art batch type electrolyzed water producing apparatus is constructed to produce electrolyzed water having a desired pH value by controlling the electrolytic period of time. For example, a timer capable of adjusting the electrolytic period of time is mounted in the electrolyzed water producing apparatus, so that electrolyzed water having an intended pH value is produced by selecting an electrolytic period of time according to a user's preference.

However, the prior art batch type electrolyzed water producing apparatus is capable of re-electrolyzing the electrolyzed water resulting from the completion of the electrolysis and hence, in a few cases, the user performs the re-electrolysis of the electrolyzed water intentionally or by mistake. Therefore, it is difficult to correctly maintain and control the pH value of the electrolyzed water in the prior art batch type electrolyzed water producing apparatus.

SUMMARY OF THE INVENTION

It is a first object of the present invention to provide an electrolyzed water producing process and apparatus in which the deposits on the electrode plates can be automatically removed.

It is a second object of the present invention to provide an electrolyzed water producing process and apparatus in which the re-electrolysis of the electrolyzed water resulting from the completion of the electrolysis can be prevented to correctly maintain and control the pH value of the electrolyzed water.

To achieve the above objects, according to the present invention, there is a method of producing electrolyzed water, comprising the steps of: filling at least two electrolyzing chambers with subject water to be electrolyzed; connecting an electrode plate provided in one of the electrolyzing chambers to an anode, and connecting an electrode plate provided in the other of the electrolyzing chambers to a cathode; applying a voltage to the subject water and producing electrolyzed water in the electrolyzing chambers; discharging the electrolyzed water out of the electrolyzing chambers; filling the electrolyzing chambers with new subject water to be electrolyzed; connecting the electrode plate provided in the one of the electrolyzing chambers to the cathode, and connecting the electrode plate provided in the other of the electrolyzing chambers to the anode; and applying a voltage to the new subject water and producing electrolyzed water in the electrolyzing chambers.

In this case, it is preferable that the method further includes a step of indicating whether the electrolyzed water produced in each of the electrolyzing chambers is electrolyzed acidic water or electrolyzed alkaline water, at least prior to the step of discharging the electrolyzed water out of the electrolyzing chambers.

Preferably, the period of time of application of the voltage to the subject water is variable and is determined in accordance with the pH value of the electrolyzed water produced in the electrolyzing chambers.

Preferably, the method further includes a step of inhibiting the application of the voltage to the subject water after the step of applying the voltage to the subject water and producing the electrolyzed water in the electrolyzing chambers.

To achieve the above object, according to the present invention, there is also provided an apparatus for producing electrolyzed water comprising: an electrolytic cell having a first electrode plate to which one of an anode and a cathode is connected, a second electrode plate to which the other of the anode and the cathode is connected, and a membrane provided between the first electrode plate and the second electrode plate to define at least two electrolyzing chambers; inlet ports through which subject water is introduced into the electrolyzing chambers; outlet ports provided in the electrolyzing chambers, respectively, through which electrolyzed water is discharged; valves provided in the outlet ports, respectively; and a polarity reversing circuit for reversing the polarity of the anode and the cathode connected to the first and second electrode plates.

In this case, it is preferable that the apparatus further includes indicators for indicating the types of the electrolyzed water discharged through the outlet ports, respectively.

Further, it is preferable that the apparatus further includes a detecting means for detecting whether the valves are open or not, an integrator for integrating a total period of time for which the valves are open, and a judging circuit for delivering a signal for inhibiting the supply of an electric current to between the first electrode plate and the second electrode plate, when the total period of time integrated by the integrator does not reach a predetermined reference period of time.

The present invention provides a so-called batch type electrolyzed water producing process and a batch type electrolyzed water producing apparatus.

First, in a condition in which the valves in the outlet ports have been closed, a predetermined amount of subject water is introduced into the electrolyzing chambers defined in the electrolytic cell. The positive pole is connected to one of the electrode plates, and the negative pole is connected to the other electrode plate to apply a voltage to the subject water. This causes the electrolysis of the subject water to be carried out, so that an electrolyzed acidic water is collected in the anode chamber, and an electrolyzed alkaline water is collected in the cathode chamber. Then, the valves are opened to discharge the electrolyzed acidic water and the electrolyzed alkaline water through the outlet ports, respectively. It should be noted that the period of time of application of the voltage is determined depending upon an intended. pH value of the electrolyzed water.

In the present invention, the polarity of the voltage applied to the electrode plates may be reversed at a predetermined interval (for example, every time). Therefore, when electrolyzed water is produced after reversion of the polarity of the voltage applied to the electrode plates, the electrode plate which has served as the anode plate before the reversion is converted into the cathode plate, and the electrode plate which has served as the cathode plate before the reversion is converted into the anode plate.

Thus, even if a portion of cations contained in the subject water is deposited on the cathode plate, this cathode plate serves as the anode plate to perform the electrolysis, so that the deposits are cationized again to release electron and dissolved into the subject water. The dissolved cations are collected in the cathode chamber (i.e., the electrolyzing chamber which has been the anode chamber before the reversion) and provided as being contained in the electrolyzed alkaline water. In this way, according to the present invention, the deposits on the cathode plate are ionized and removed and therefore, it is possible to prevent a reduction in electrolyzing capability. The removed cations are utilized as being contained in the electrolyzed alkaline water collected in the cathode chamber and hence, it is unnecessary to discard water containing deposits dissolved therein.

However, for the electrolyzed water discharged through the outlet ports, the electrolyzed acidic water and the electrolyzed alkaline water are also reversed by the reversion of the polarity of the electrode plates. Therefore, according to the present invention, the types of the electrolyzed water discharged through the outlet ports (whether such electrolyzed water is the electrolyzed acidic water or the electrolyzed alkaline water) is indicated by the indicator, thereby preventing the user's mis-recognition.

Until all of the electrolyzed water is discharged after completion of the subject water, no voltage is applied again to the electrolyzed water. To prohibit the re-electrolysis, the opened states of the valves in the outlet ports are detected by the detecting means, and a detection signal is delivered to the integrator. In the integrator, the total period of time for which the valves are open is integrated, and the total period of time integrated by the integrator is delivered to the judging circuit. In the judging circuit, the total period of time is compared with the predetermined reference period of time. When the total period of time does not reach the reference period of time, the supply of the electric current to the electrode plates is blocked.

The reference period of time is previously determined as a period of time from the start of the discharge of the electrolyzed water to a time point when the electrolytic cell is emptied, and using the result of judgment by the judging circuit, it is judged whether or not the electrolyzed water is present in the electrolytic cell. If it is decided as a result of such judgment that the electrolyzed water is present in the electrolytic cell, the energization of the electrode plates is inhibited, thereby enabling the re-electrolysis of the electrolyzed water to be prevented.

BRIEF DESCRIPTION OF THE DRAWINGS

Further objects and advantages of the invention can be more fully understood from the following detailed description taken in conjunction with the accompanying drawings in which:

FIGS. 1 to 6 are concept diagrams for explaining an electrolyzed water producing method according to the present invention, wherein FIG. 1 is a diagram illustrating a step of filling electrolyzing chambers with subjecting water;

FIG. 2 is a diagram illustrating a step of applying a voltage to the subject water and producing electrolyzed water;

FIG. 3 is a diagram illustrating a step of discharging electrolyzed water produced at the step shown in FIG. 2;

FIG. 4 is a diagram illustrating a step of filling electrolyzing chambers with new subject water;

FIG. 5 is a diagram illustrating a step of applying a voltage to the subject water and producing electrolyzed water;

FIG. 6 is a diagram illustrating a step of discharging electrolyzed water produced at the step shown in FIG. 5;

FIG. 9 is a sectional view illustrating an internal structure of the electrolyzed water producing apparatus shown in FIG. 8;

FIG. 10 is a sectional view taken along a line XX—XX in FIG. 9;

DESCRIPTION OF THE PREFERRED EMBODIMENTS

The present invention will now be described by way of a preferred embodiment in connection with the accompanying drawings.

Figure 7:
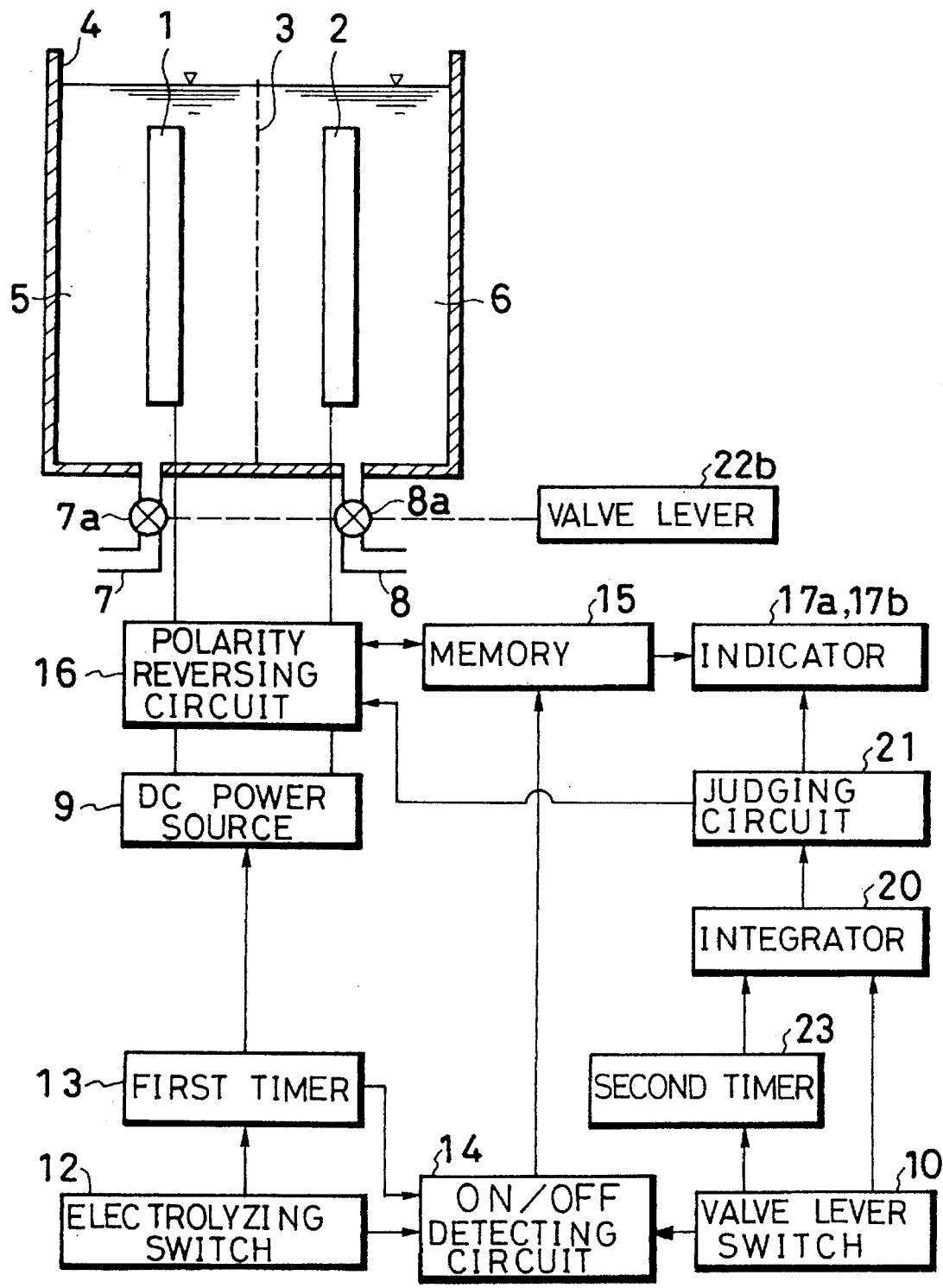
FIG. 7 is an arrangement diagram illustrating an electrolyzed water producing apparatus according to the present invention.

Referring to FIG. 7, an electrolyzed water producing apparatus according to the present invention is a so-called "batch type" electrolyzed water producing apparatus and includes an electrolytic cell 4. An anode plate 1 and a cathode plate 2 are disposed in the electrolytic cell 4, and a membrane 3 is disposed between the two electrode plates 1 and 2 to define two electrolyzing chambers 5 and 6 in the electrolytic cell. Each of the electrode plates 1 and 2 is formed by coating (or may be formed by firing deposition of) a thin film of platinum or a platinum-iridium alloy onto a surface of a plate, for example, made of titanium. The membrane 3 is formed, for example, from an ion exchange resin membrane made of a polyethylene-based resin or a micro-porous thin membrane made of a synthetic resin.

In the electrolyzed water producing apparatus of this embodiment, the polarity (positive and negative poles) of the power source connected to the electrode plates is switched over, whenever one-run of electrolysis is completed. More specifically, in a condition shown in FIG. 2, the positive pole is connected to the left electrode plate 1, and the negative pole is connected to the right electrode plate 2, so that the left electrolyzing chamber is the anode chamber, and the right electrolyzing chamber 6 is the cathode chamber. However, when new subject water is then introduced into the electrolyzing chambers to carry out the electrolysis, the negative pole is connected to the left electrode plate 1, and the positive pole is connected to the right electrode plate 2, as shown in FIG. 5, so that the left electrolyzing chamber 5 is the cathode chamber, and the right electrolyzing chamber 5 is the anode chamber.

Figure 11:
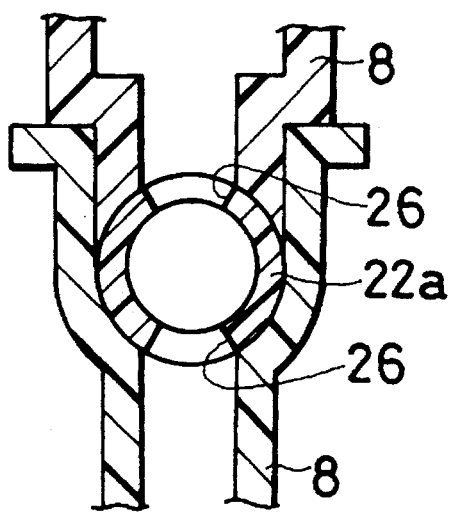
FIGS. 11 and 12 are enlarged sectional views of a rotary valve shown in FIG. 10.
Figure 12:
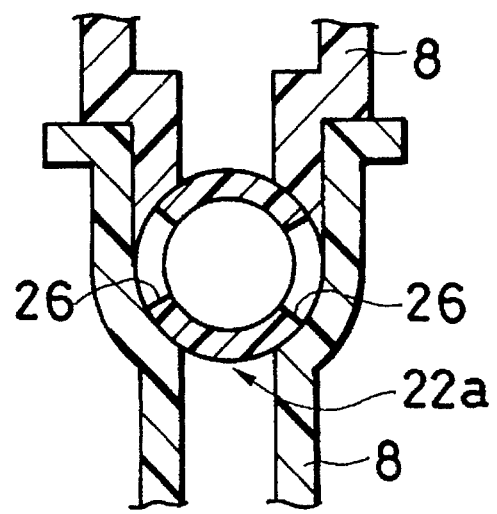

Outlet pipes 7 and 8 for discharging the electrolyzed water are mounted to the electrolyzing chambers 5 and 6, respectively, and valves 7a and 8a are mounted in the outlet pipes 7 and 8, respectively. Thus, if the valves 7a and 8a are opened, electrolyzed water produced in the electrolyzing chambers is discharged by its own weight through discharge ports 7b and 8b. Each of the valves 7a and 8a is a rotary valve. A single rod 22a is inserted through bodies of the two valves 7a and 8a, as shown in FIGS. 9 and 10, and is provided with a through-hole 26, as shown in FIGS. 11 and 12. Thus, if a valve lever 22b mounted at one end of the rod 22a is turned, the two valves 7a and 8a are simultaneously opened and closed. For example, if the valve lever 22b is turned in a clockwise direction, the valves 7a and 8a are closed (see FIG. 12). Reversely, if the valve lever 22b is turned in a counterclockwise direction, the valves 7a and 8a are opened (see FIG. 11).

Figure 8:
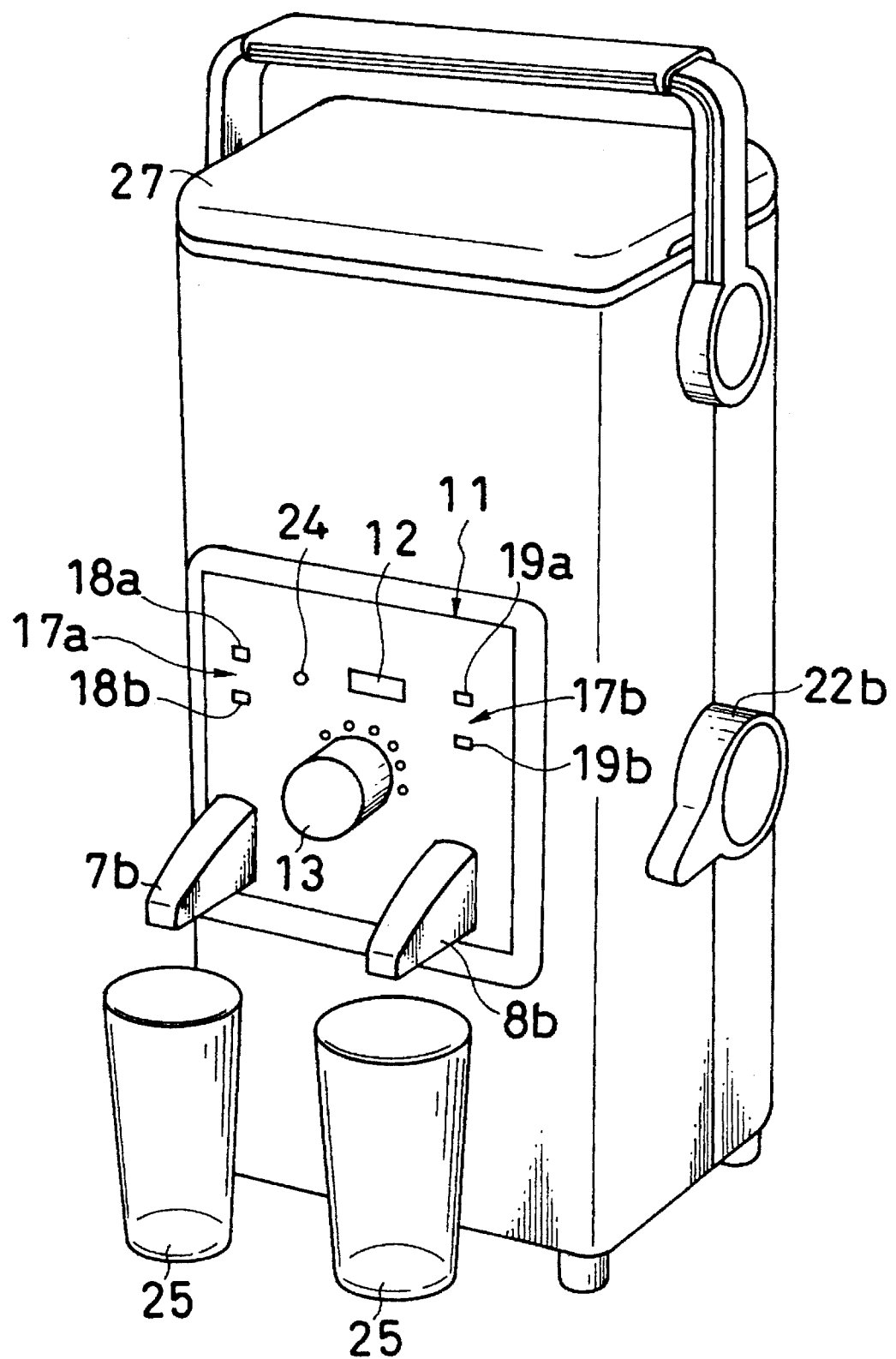
FIG. 8 is a perspective view of one embodiment of an electrolyzed water producing apparatus according to the present invention.

The two outlet pipes 7a and 8a are formed at the same inside diameter, so that the turning of the valve lever 22b causes the same amount of electrolyzed acidic water and electrolyzed alkaline water to be discharged through the discharge ports 7b and 8b (see FIGS. 8–10). Thus, only by turning the valve lever after completion of the electrolysis, the liquid levels in the two electrolyzing chambers 5 and 6 are always brought into the same location, and the electrolyzing chambers 5 and 6 are simultaneously emptied (see FIG. 9). Therefore, it is possible to prevent the electrolyzed water from being passed from one of the electrolyzing chambers through the membrane into the other electrolyzing chamber. It should be noted that the means for equalizing the amount of electrolyzed water discharged is not limited to that in the embodiment shown in FIGS. 9 and 10.

Figure 13:
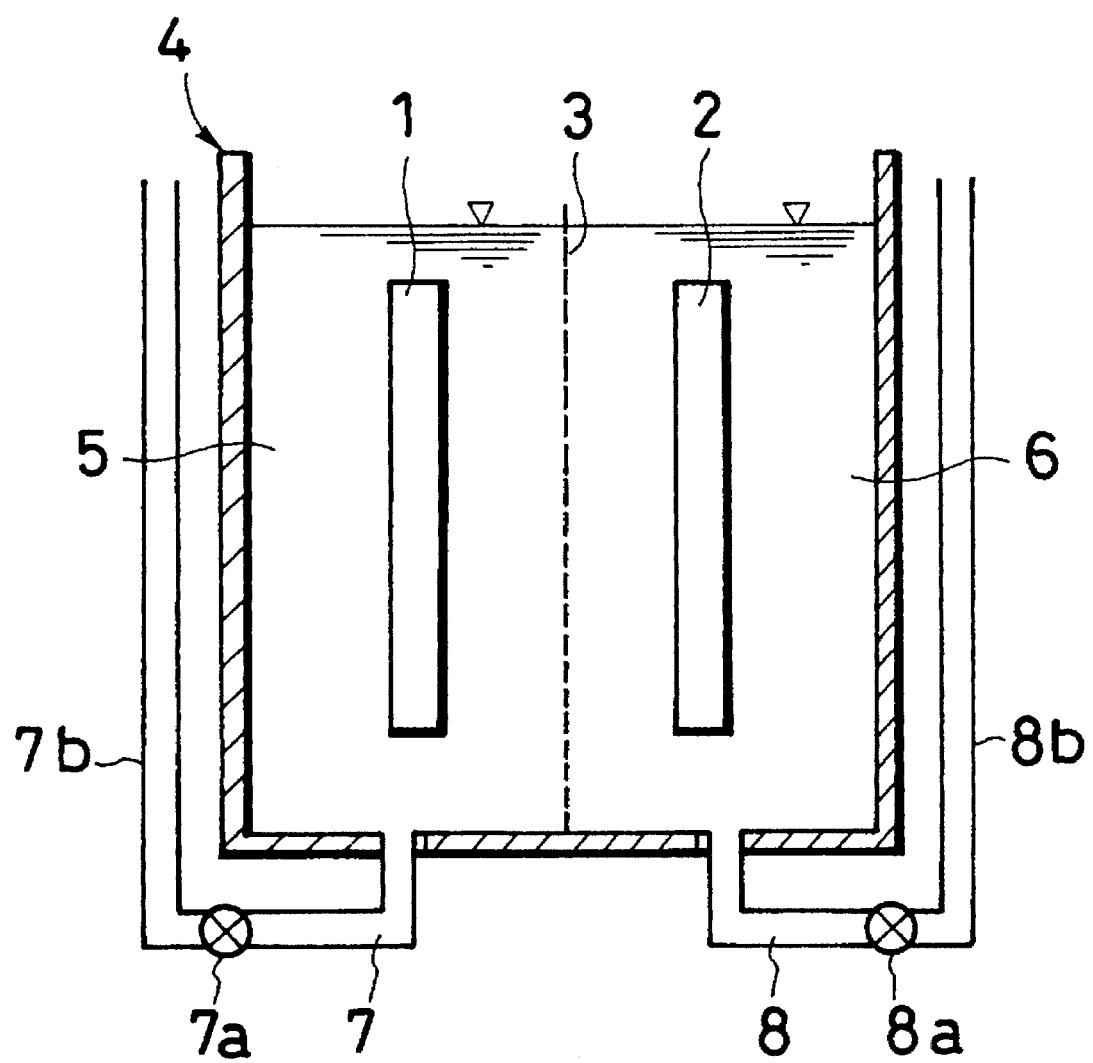
FIG. 13 is a diagram illustrating a concept of another embodiment of an electrolyzed water producing apparatus according to the present invention.
Figure 14:
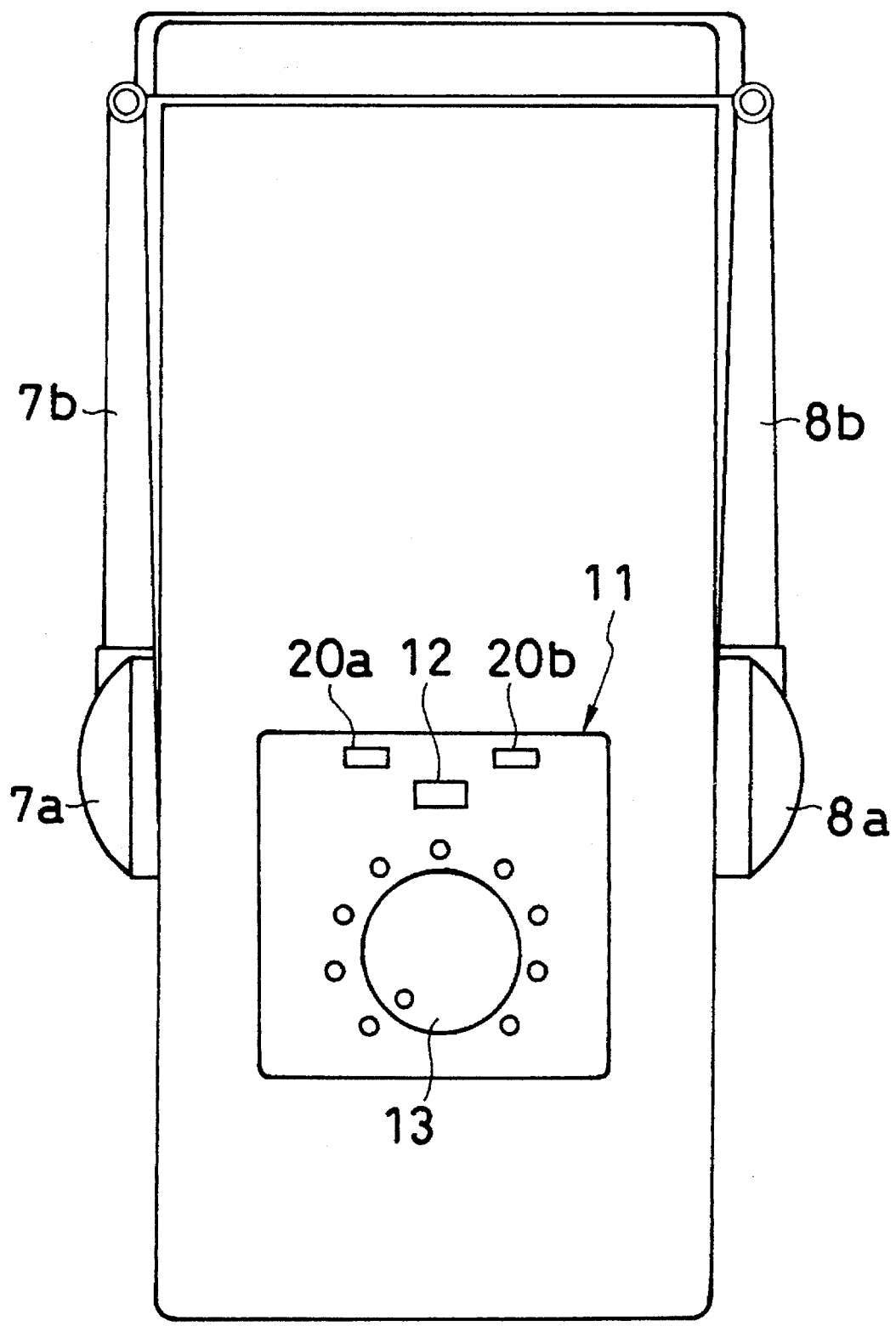
FIG. 14 is a front view illustrating an appearance of the electrolyzed water producing apparatus shown in FIG. 13.
Figure 15:
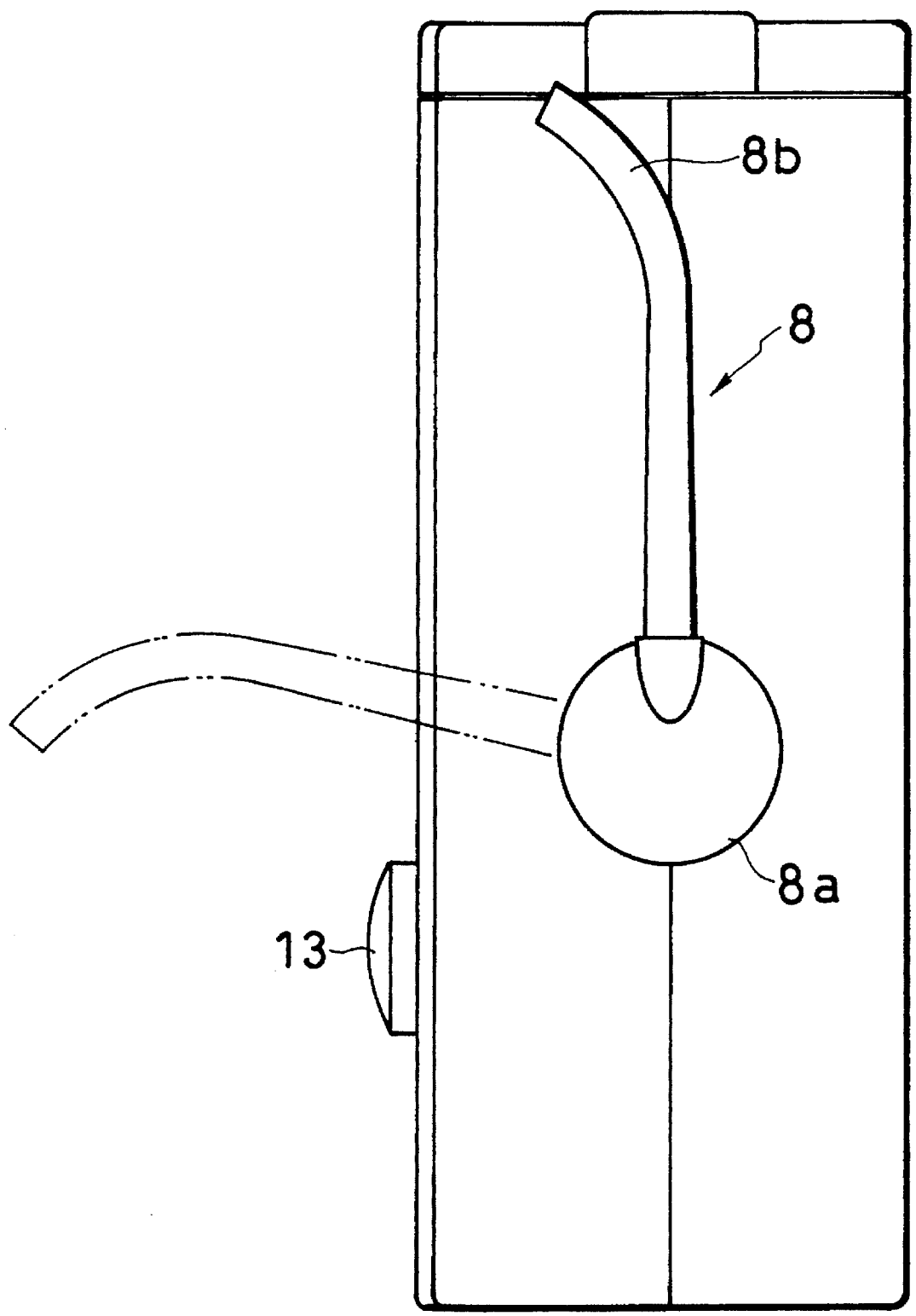
FIG. 15 is a side view illustrating the appearance of the electrolyzed water producing apparatus shown in FIG. 13.

In the electrolyzed water producing apparatus shown in FIGS. 9 and 10, however, when the valve lever is turned, the electrolyzed water is necessarily discharged through the two discharge ports 7b and 8b and hence, it is necessary to prepare containers 25, 25 at the two discharge ports 7b and 8b, as shown in FIG. 8, when the electrolyzed water is to be discharged. Therefore, if the electrolyzed water is desired to be discharged from either electrolyzing chamber 5 or 6, valve levers may be provided at the valves 7a and 8a, respectively without interconnection of the valves 7a and 8a by the rod 22a. For example, in another embodiment of the present invention shown in FIGS. 13 to 15, the two outlet pipes 7 and 8 connected to a bottom surface of the electrolyzing cell 4 are provided with rotary valves 7a and 8a, respectively and discharge nozzles 7b and 8b rotatable about the rotary valves 7a and 8a, respectively. The structure of the rotary valves 7a and 8a is as shown in FIGS. 11 and 12, so that when the discharge nozzle is risen, as shown by a solid line in FIG. 15, the corresponding valve is closed, and when the discharge nozzle is turned and tilted down, as shown by a two-dot dashed line in FIG. 15, the corresponding valve is open. It should be appreciated that if a leading end of the discharge nozzle is formed at a level higher than the liquid level in the electrolytic cell, the valves 7a and 8a can be omitted.

The supply of the subject water into the electrolytic cell 4 is conducted through an opening at an upper portion of the electrolytic cell 4. A lid 27 is mounted in the electrolyzed water producing apparatus of this embodiment, as shown in FIG. 8. However, this lid 27 is provided for preventing dusts from entering the electrolytic cell and in the batch type electrolyzed water producing apparatus, it is not necessary to closely seat the interior of the electrolytic cell.

Figure 2:
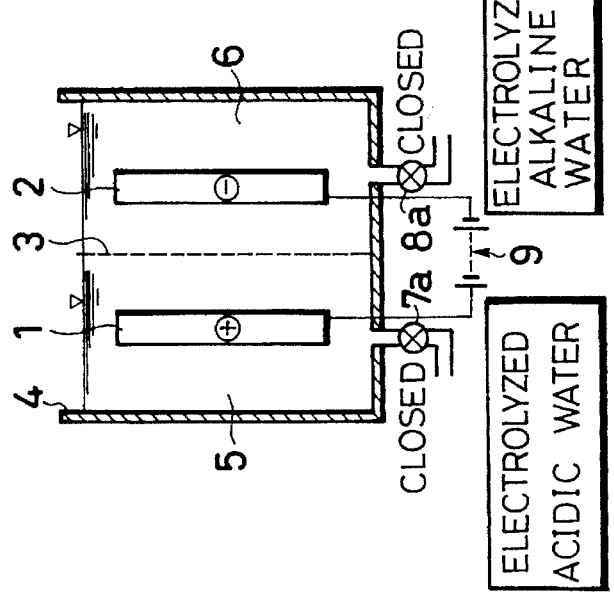

When the electrolysis has been carried out with the positive pole of the DC power source 9 being connected to the left electrode plate 1 and the negative pole of the DC power source 9 being connected to the right electrode plate 2, as shown in FIG. 2, the electrolyzed acidic water is discharged through the discharge port 7b provided in the anode chamber 5, and the electrolyzed alkaline water is discharged through the discharge port 8b provided in the cathode chamber 6. However, if the polarity of voltage applied to the electrode plates 1 and 2 is reversed, the electrolyzed acidic water and the electrolyzed alkaline water discharged respectively through the discharge ports 7b and 8b are also reversed.

As described above, a DC current from the DC power source 9 provided by the rectification of an AC power source by a diode rectifier and the subsequent smoothing thereof is applied to the two electrode plates 1 and 2, When an electrolyzing switch 12 provided on a indicating panel 11 shown in FIG. 8 is pushed down, an electrolysis is started. When a period of time set in a first timer 13 has been lapsed, the electrolysis is stopped.

A power source lamp 24 shown in FIG. 8 is turned ON, when an alternating current (AC) plug is inserted into a plug socket.

In a control circuit in the present embodiment (see FIG. 7), in order to reverse the polarity of voltage applied to the electrode plates 1 and 2 at every time of the start of the electrolysis, signals from the electrolyzing switch 12 and the first timer 13 are applied to an ON/OFF detecting circuit 14 and stored in a memory 15 from which a signal indicative of a command to reverse the polarity is delivered to a polarity reversing circuit 16 and indicators 17a and 17b.

The signal delivered from the ON-OFF detecting circuit 14 to the memory 15 is either an ON signal or OFF signal. When the ON signal from the electrolyzing switch 12 and the ON signal from the timer 13 are received into the detecting circuit 14, the signal delivered from the ON-OFF detecting circuit 14 is the ON signal. Reversely, when the OFF signal from the first timer 13 is received into the detecting circuit 14, the signal delivered from the ON-OFF detecting circuit 14 is the OFF signal. Even if the ON signal from the electrolyzing switch 12 is repeatedly received into the ON/OFF detecting circuit 14, while the ON signal from the first timer 13 is being received into the ON/OFF detecting circuit 14, the latter cancels this ON signal received thereinto from the electrolyzing switch 12. In this manner, even if the electrolyzing switch 12 is repeatedly pushed down, the ON signal therefrom is canceled and cannot be delivered to the timer 13. Therefore, the period of time initially set by the first timer 13 cannot be extended (see FIG. 7).

When the OFF signal is delivered from the first timer 13 to the ON/OFF detecting circuit 14 while the ON signal is being delivered from the ON/OFF detecting circuit 14 to the memory 15, the OFF signal is delivered from the ON/OFF detecting circuit 14 to the memory 15 (see FIG. 7).

Figure 18:
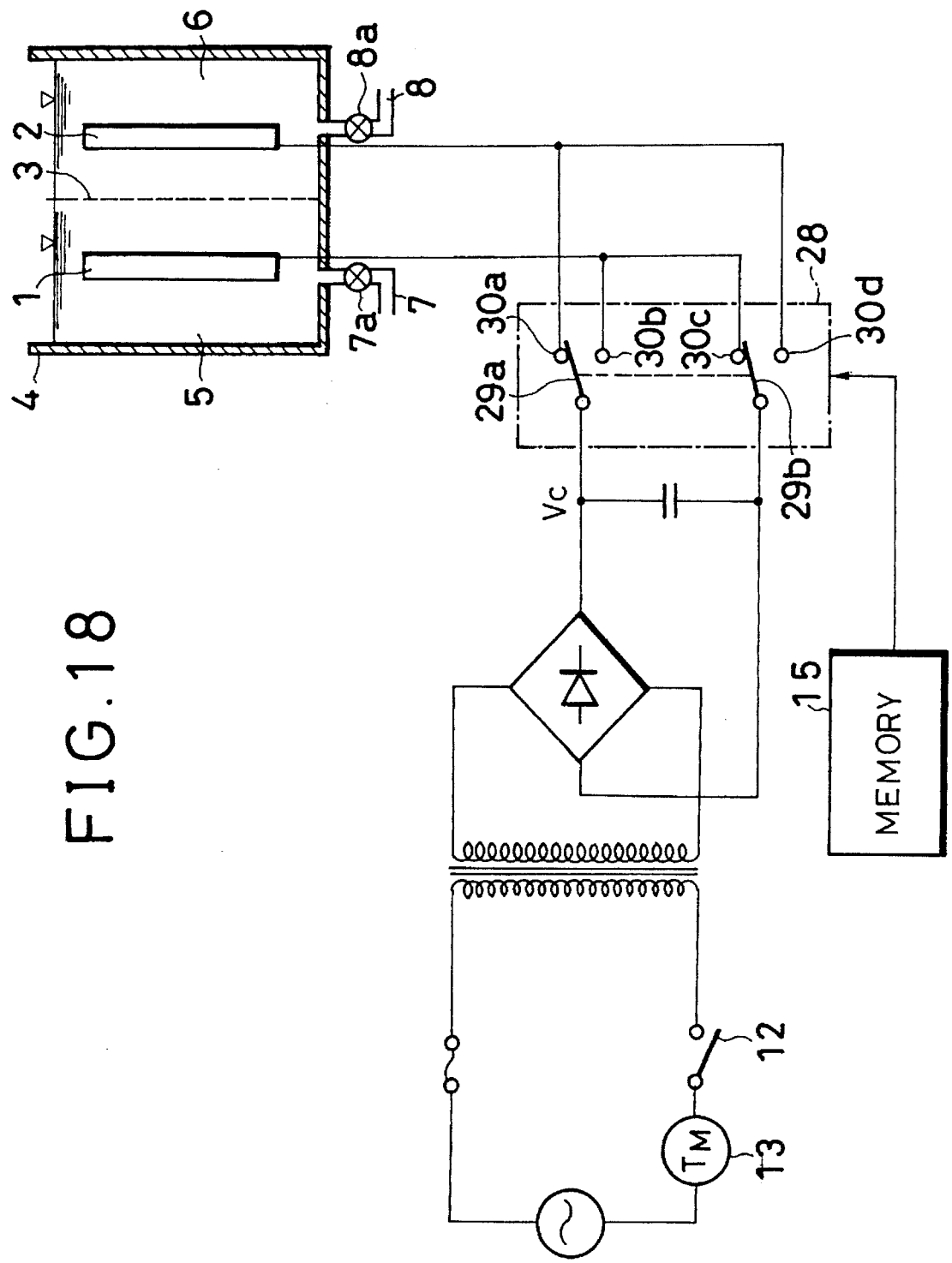
FIG. 18 is an electric circuit diagram illustrating a particular example of a polarity reversing circuit.

On the other hand, the now signal (the ON or OFF signal) is stored in the memory 15 for a period from the time point when the signal has been received thereinto from the ON/OFF detecting circuit 14, until a next signal will be received into the memory 15. If a next ON signal from the ON/OFF detecting circuit 14 is received into and written in the memory 15 when the OFF signal has been stored in the memory 15, a signal indicative of a command to reverse the polarity is delivered from the memory 15 to the polarity reversing circuit 16. The polarity reversing circuit 16 receives this signal to reverse the polarity of the voltage applied heretofore to the electrode plates 1 and 2 from the DC power source (see FIG. 7). For example, a relay 28 shown in FIG. 18 can be used as the polarity reversing circuit 16. The relay 28 includes movable terminals 29a and 29b, and a stationary terminals 30a, 30b, 30c and 30d. The movable terminals 29a and 29b are switched over in operative association with each other. The stationary terminals 30b and 30c are connected to one of the electrode plates 1, and the stationary terminals 30a and 30d are connected to the other electrode plate 2.

The timing for reversing the polarity of voltage applied to the electrode plates 1 and 2 (see FIG. 18) may be such that the polarity is reversed at every time of completion of one run of electrolysis, or after an n-number of runs of electrolysis carried out at the same polarity. However, it is preferable that the period of time of connection to the positive pole and the period of time of connection to the negative pole are equalized to each other as much as possible in order to Completely dissolve the metal scales.

If the polarity of voltage applied to the electrode plates 1 and 2 (see FIG. 18) is reversed in this manner, the type of electrolyzed water discharged through each discharge port 7b, 8b is also reversed at each time (see FIG. 8). Thereupon, when the signal indicative of a command to reverse the polarity is delivered from the memory 15 to the polarity reversing circuit 16, a signal indicative of a command to reverse the indication is delivered from the memory 15 to the control circuit for the indicators 17a and 17b (see FIG. 7).

Each of the indicators 17a and 17b comprises light-emitting diodes (LEDs), as shown in FIG. 8. More specifically, there is four LEDs 18a, 18b, 19a and 19b for indicating the types of electrolyzed water discharged from the discharge ports 7b and 8b. As shown in FIG. 8, the left indicator 17a is comprised of two LEDs 18a and 18b. When the electrolyzed water discharged through the left discharge port 7b is an electrolyzed acidic water, the LED 18a for indicating the electrolyzed acidic water is lighted up, and when the electrolyzed water discharged through the left discharge port 7b is an electrolyzed alkaline water, the LED 18b for indicating the electrolyzed alkaline water is lighted up. Likewise, the right indicator 17b is comprised of two LEDs 19a and 19b. When the electrolyzed water discharged through the right discharge port 8b is an electrolyzed acidic water, the LED 19a for indicating the electrolyzed acidic water is lighted up, and when the electrolyzed water discharged through the right discharge port 8b is an electrolyzed alkaline water, the LED 19b for indicating the electrolyzed alkaline water is lighted up. Thus, it is possible for the user to judge the type of the electrolyzed water discharged from each of the discharge ports 7b and 8b at a look by viewing the lighting of each of the indicators 17a and 17b (see FIG. 8).

It should be appreciated that the signal indicative of a command to reverse the indication may be delivered from the memory 15 to the indicators 17a and 17b simultaneously with the delivery of the signal indicative of a command to reverse the polarity from the memory 15 to the polarity reversing circuit 16. Or the actual polarity of voltage applied may be received from the polarity reversing circuit 16, and a signal indicative of an indicating command may be supplied to the indicators 17a and 17b, so that this actual polarity is indicated as it is (see FIG. 8). If so, it is possible to more reliably indicate the correct type of the electrolyzed water.

The delivery of the signal from the memory 15 to the indicators 17a and 17b need not be simultaneous with the reversion of the polarity of voltage applied to the electrode plates (see FIG. 8), but must be conducted at least after discharge of the electrolyzed water.

Further, in the indication by the LEDs, the LED is lighted up when the power source switch is turned OFF. Therefore, when the electrolyzing switch 12 has been tuned ON again, the type of electrolyzed water at the time of turning OFF of the power source switch is stored and retained as it is (see FIG. 8).

The indicators in the present invention are not limited to those in the embodiment shown in FIG. 8.

Figure 16:
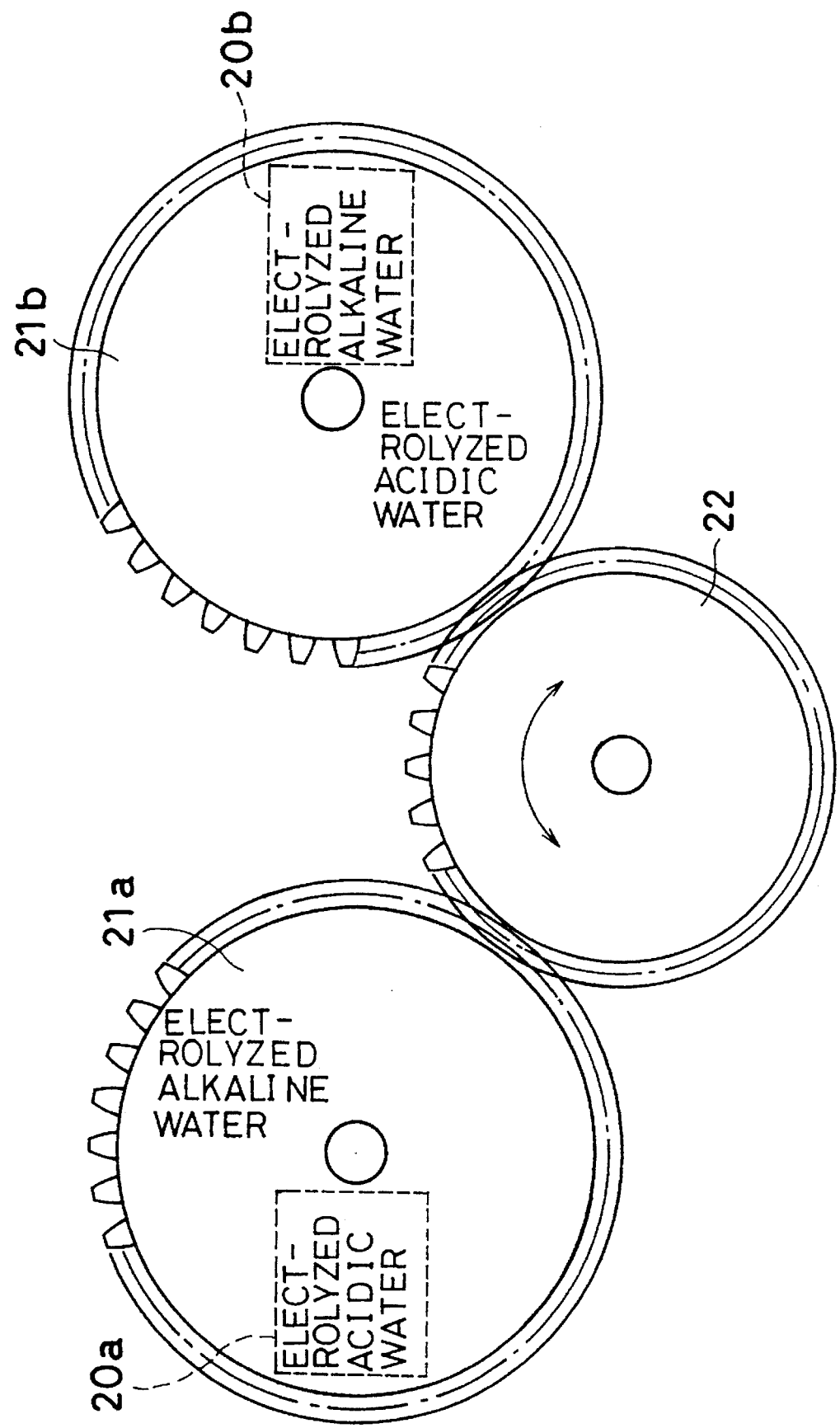
FIG. 16 is a front view illustrating an indicator provided within the electrolyzed water producing apparatus shown in FIG. 14.

For example, although the LEDs have been used to provide an electric indication in the embodiment shown in FIG. 8, windows 20a and 20b may be opened in the indicating panel 11, and two gears 21a and 21b shown in FIG. 16 may be provided so that characters indicating either "electrolyzed acidic water" or "electrolyzed alkaline water" can be presented through the windows 20a and 20b. In this case, the two gears 20a and 20b are rotated by rotating a driving gear 22 meshed with the two gears 21a and 21b by an actuator, so that the indication of the electrolyzed water discharged through the left discharge port 7b is presented in the left window 20a, and the indication of the electrolyzed water discharged through the right discharge port 8b is presented in the right window 20b (see FIG. 14). If the type of electrolyzed water is indicated by the mechanical means in this manner, the indication is continued even if the power source switch 12 is turned OFF. It should be noted that a signal indicative of a command to operate the actuator is delivered from the memory 15 shown in FIG. 7.

In the electrolyzed water producing apparatus of this embodiment, the electrolyzed water once produced from the completion of the electrolysis cannot be electrolyzed again. More specifically, as shown in FIG. 7, there is a valve lever switch 10 for detecting the turned position of the valve lever 22b. Thus, when the valve lever 22b is turned to a position in which the valves 7a and 8a are closed, an ON signal is delivered from the valve lever switch 10 to a second timer 23 and an integrator 20. When the valve lever 22b is turned to a position in which the valves 7a and 8a are opened, an OFF signal delivered from the valve lever switch 10 to the second timer 23 and the integrator 20.

When the OFF signal from the valve lever switch 10 has been received into the second timer 23 and the integrator 20 (i.e., when it has been detected that the valves 7a and 8a have been opened), the second timer 23 is started to be operated and at the same time, the integration of a period of time is started in the integrator 20. However, when the ON signal from the valve lever switch 10 is detected during integration, i.e., when it is detected that the valves 7a and 8a have been closed, the integration is suspended (see FIG. 7).

It is compared at a predetermined time interval in the judging circuit 21 whether or not the period of time integrated in the integrator 20 has reached a predetermined reference period of time T2. As used herein, the term "reference period of time T2" refers to a period of time from a time point when the valve lever 22b is opened to a time point when all of the electrolyzed water in the electrolytic cell is discharged. In fact, the reference period of time is determined as a value slightly larger than such period of time with an error added thereto (see FIG. 7).

In short, in the present embodiment, it is judged on the basis of the ON/OFF signals from the valve lever switch 10 whether or not the electrolytic cell has been emptied. If the valve lever 22b is closed in the middle of discharging of the electrolyzed water with the valve lever 22b opened, the integration of the period of time is suspended. If the discharging of the electrolyzed water is restarted, the integration is started again. In this manner, the total period of time of discharge is counted (see FIG. 7).

If the result of the integration in the integrator 20 has reached the reference period of time T2, a turning-OFF signal is delivered from the judging circuit 21 to the indicators 17a and 17b to inform the user of the fact that the discharge of the electrolyzed water has been completed. Reversely, if the result of the integration in the integrator 20 has not reached the reference period of time T2, a signal indicative of a command to cut off the supply of the electric current to the electrode plates 1 and 2 is delivered from the judging circuit 21 to the polarity reversing circuit 16 or the DC power source 9 (see FIG. 7).

An electrolyzed water producing process will now be described in connection with FIGS. 1 to 6 and 17.

Figure 1:
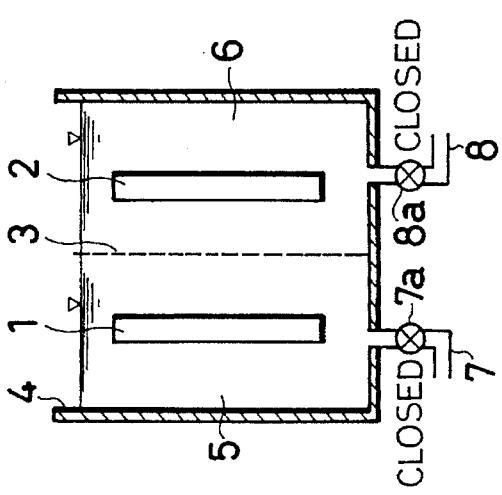

First, as shown in FIG. 1, FIG. 8, the valve lever 22b is turned to close the valves 7a and 8a, thereby permitting subject water to be introduced through the opening in the upper surface of the electrolytic cell 4 into the electrolyzing chambers 5 and 6, so that the electrolyzing chambers 5 and 6 are filled up with the subject water. When the AC plug is inserted into the plug socket in the AC power source (at S1), the initializations of the first timer 13, the ON/OFF detecting circuit 14, the memory 15, the second timer 23, the integrator 20 and the judging circuit 21 are performed (at S2), and the power source lamp 24 is lighted up (at S3) as shown in FIG. 17.

Then, the first timer 13 (see FIG. 8) provided on the indicating panel 11 (see FIG. 8) is set at a desired time value (at S4) and then, the electrolyzing switch 12 (see FIG. 8) is pushed down (at S5). The first timer 13 is provided to determine a pH value of the electrolyzed water produced. If the electrolyzing period of time is set at a larger value, the degree of electrolysis is larger (namely, if the electrolyzed water is acidic, it has a smaller pH value, and if the electrolyzed water is alkaline, it has a larger pH value). As shown at S5 shown in FIG. 17, if a solution having a larger degree of dissociation such as a salt solution is added to the subject water, the electrolytic efficiency is increased, so that the electrolysis can be performed in a short time.

Figure 17:
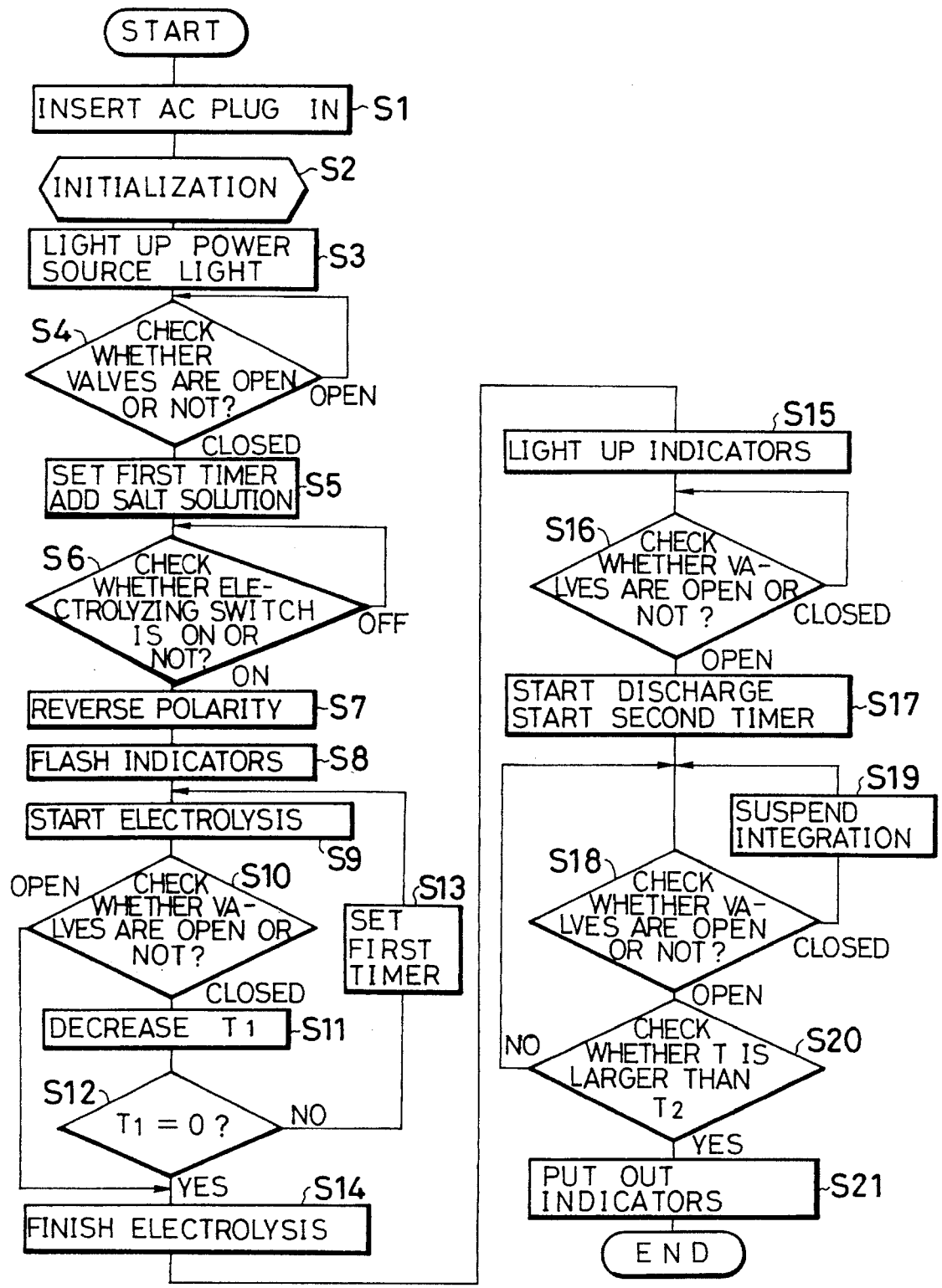
FIG. 17 is a flow chart illustrating a control procedure for the electrolyzed water producing apparatus according to the present invention.

When the electrolyzing switch 12 (see FIG. 8) is turned ON at S6 shown in FIG. 17, the polarity of voltage applied heretofore is reversed (at S7), and the LEDs 18a, 18b, 19a and 19b (see FIG. 8) are flashed (at S8). Then, as shown in FIG. 7, the first timer 13 is operated to start the electrolysis (at S9), and a DC current is applied to the two electrode plates 1 and 2. If the application of the voltage is as shown in FIG. 2, a positive voltage is applied to the left electrode plate 1, and a negative voltage is applied to the right electrode plate 2.

At the same time, it is confirmed that the valve lever 22 has been closed (at S10) and moreover, the count-down of the set time T1 is started (at S11 and S12). Thus, the subject water in the electrolyzing chambers is electrolyzed, so that anions are collected into the electrolyzing chamber 5 on the side of the anode, and cations are collected into the electrolyzing chamber 6 on the side of cathode. Therefore, the electrolyzed acidic water is produced in electrolyzing chamber 5 on the side of the anode, and the electrolyzed alkaline water is produced in the electrolyzing chamber 6 on the side of cathode (see FIG. 7).

For safety's sake, when the valve lever 22b is opened during electrolysis, the electrolysis is forced terminated (S10→S14). The time once set in the first timer 13 can be changed only during electrolysis (S12→S13→S9).

When the OFF signal is delivered from the first timer 13 to the DC power source after a lapse of the set time, the DC power source 9 is cut off to terminate the electrolysis (at S14), the flashing of the indicators is changed to the lighting-up the user views the lighting-up of the indicators, turns the valve lever 22b, prepares the containers 25 for the nozzles 7b and 8b, respectively, and discharges the electrolyzed acidic water and the electrolyzed alkaline water to the empty of the electrolytic cell 4 (see FIG. 8).

At this time, in the left indicator 17a on the indicating panel 11, the LED 18a indicating the electrolyzed acidic water is in its lighted-up state and in the right indicator 17a, the LED 19b is in its lighted-up state as shown in FIG. 8. Therefore, it is not feared at all that the user mis-recognizes the type of the electrolyzed water.

Referring to FIG. 8, when the valve lever 22b is opened (at S16), the valve lever switch 10 provided at the valve lever 22b delivers the OFF signal to the second timer 23 and the integrator 20, thereby starting the operation of the second timer 23 (at S17). At this time, unless the valve lever 22b is closed in the middle of pouring of the electrolyzed water into the container, the times counted by the second timer 23 is integrated and successively delivered to the judging circuit 21. The integrated period of time is compared with the reference period of time T2 in the judging circuit 21 (at S20). When the integrated period of time has reached the reference period of time T2, the LEDs 18a, 18b, 19a and 19b are put out (at S21).

When the valve lever 22b has been closed in the middle of pouring of the electrolyzed water into the container 25, the integration in the integrator 20 is suspended until the valve lever will be subsequently opened, irrespective of the number of closing runs (S18→S19).

In this manner, in the electrolyzed water producing apparatus of this embodiment, the electrolysis is not started, unless the electrolytic cell is emptied of the electrolyzed water and therefore, the electrolyzed water once produced from the electrolysis is prevented from being electrolyzed again. As a result, the electrolyzed water can be produced in the electrolyzing period of time initially set, i.e., the electrolyzed water thus produced has a desired pH value.

Simultaneously with turning-OFF of the first timer 13, the OFF signal is delivered from the first timer 13 to the ON/OFF detecting circuit 14 and further, the OFF signal is delivered from the ON/OFF detecting circuit 14 to the memory 15. Thus, an OFF information is written in the memory 15 (see FIG. 7).

Figure 3:
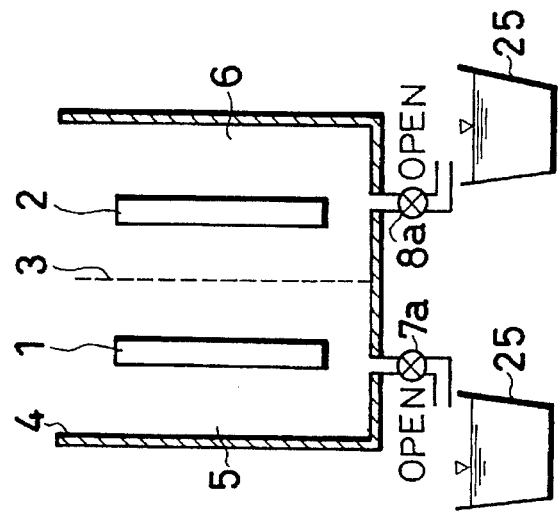

As shown in FIG. 3, when all of the electrolyzed water produced in the electrolyzing chambers 5 and 6 is discharged, new subject water is introduced into the electrolyzing chambers 5 and 6, as shown in FIG. 4. When the electrolyzing switch 12 is pushed down, and the first time 13 is operated, the ON signal is delivered from the ON/OFF detecting circuit 14 to the memory 15, and an ON information is written in the memory 15 (see FIG. 7).

At the same time, the signal indicative of a command to reverse the polarity is delivered from the memory 15 to the polarity reversing circuit 16, thereby causing the polarity of the voltage applied from the DC power source 9 to the electrode plates 1 and 2 is reversed. Thus, the electrode plate 1 is converted into the cathode plate, and the electrode plate 2 is converted into the anode plate, as shown in FIG. 5. If the electrolysis is carried out in this condition in the above-described procedure, the electrolyzed alkaline water is produced in the left electrolyzing chamber 5, and the electrolyzed acidic water is produced in the right electrolyzing chamber 6. Therefore, as shown in FIG. 6, the electrolyzed alkaline water is supplied through the left nozzle 7a, and the electrolyzed acidic water is supplied through the right nozzle 8a.

In the last run of electrolysis shown in FIG. 2, a portion of cations contained in the subject water are deposited and intend to reduce the electrolyzing capability. In the electrolyzed water producing process of this embodiment, however, when the next run of electrolysis is to be conducted, the polarity of voltage applied to the electrode plates is reversed and therefore, the cathode plate 2 with the cations deposited thereon serves as the anode plate. As a result, the deposits on the electrode plate are cationized again to release electron and dissolved in the subject water. The dissolved cations are collected into the cathode chamber (i.e., the electrolyzing chamber which has been the anode chamber in the last run of electrolysis) and supplied in the form of the electrolyzed alkaline water through the nozzle 7b.

At this time, the signal indicative a command to reverse the polarity is delivered from the memory 15 even to the indicators 17a and 17b, so that the indication on the indicating panel 11 shown in FIG. 8 is reversed. More specifically, the LED 18b indicating the electrolyzed alkaline water is lighted up in the left indicator 17a, and the LED 19a indicating the electrolyzed acidic water is lighted up in the right indicator 17b. This eliminates the feat that the user confusedly mis-recognizes the types of the electrolyzed water. In addition, in this embodiment, the deposits on the cathode plate are cationized, and resulting cations are collected into the cathode chamber and included into the electrolyzed alkaline water for utilization. Therefore, it is not necessary to discard the water containing the deposits.

While the invention has been described in terms of its preferred embodiments, those skilled in the art will recognize with considerable modification within the spirit and scope of the appended claims.

What is claimed is:

1. A method of producing electrolyzed water comprising the steps of:

filling at least two electrolyzing chambers with subject water to be electrolyzed;

connecting an electrode plate provided in one of said electrolyzing chambers to an anode, and connecting an electrode plate provided in the other of said electrolyzing chambers to a cathode;

applying a voltage to said subject water and producing electrolyzed water in said electrolyzing chambers;

indicating whether said electrolyzed water produced in each of the electrolyzing chambers is electrolyzed acidic water or electrolyzed alkaline water;

discharging said electrolyzed water out of said electrolyzing chambers;

filling the electrolyzing chambers with new subject water to be electrolyzed;

connecting said electrode plate provided in the one of said electrolyzing chambers to the cathode, and connecting said electrode plate provided in the other of said electrolyzing chambers to the anode; and applying a voltage to said new subject water and producing electrolyzed water in said electrolyzing chambers.

2. A method of producing electrolyzed water according to claim 1, wherein the period of time of application of the voltage to said subject water is variable.

3. A method of producing electrolyzed water according to claim 2, wherein the period of time of application of the voltage to said subject water is determined in accordance with pH value of said electrolyzed water produced in said electrolyzing chambers.

4. A method of producing electrolyzed water according to claim 3, wherein said method further includes a step of inhibiting application of a voltage to said subject water after said step of applying the voltage to said subject water and producing said electrolyzed water in said electrolyzing chambers.

5. An apparatus for producing electrolyzed water comprising:

an electrolytic cell having a first electrode plate to which one of an anode and a cathode is connected a second electrode plate to which the other of the anode and the cathode is connected, and a membrane provided between said first electrode plate and said second electrode plate to define at least two electrolyzing chambers;

inlet ports through which subject water is introduced into said electrolyzing chambers;

outlet ports provided in said electrolyzing chambers, respectively, through which electrolyzed water is discharged;

valves provided in said outlet ports, respectively;

a polarity reversing circuit for reversing the polarity of said anode and said cathode connected to said first and second electrode plates; and indicators for indicating whether said electrolyzed water discharged through each of said outlet ports is electrolyzed acidic water or electrolyzed alkaline water.

6. An apparatus for producing electrolyzed water according to claim 3, wherein said apparatus further includes a detecting means for detecting whether said valves are open or not, an integrator for integrating a total period of time for which said valves are open, and a judging circuit for delivering a signal for inhibiting the supply of an electric current to between said first electrode plate and said second electrode plate, when the total period of time integrated by said integrator does not reach a reference period of time.

* * * * *

UNITED STATES PATENT AND TRADEMARK OFFICE
CERTIFICATE OF CORRECTION

PATENT NO. : 5,510,009
DATED : April 23, 1996
INVENTOR(S) : Kazuyoshi Arai et al.

It is certified that error appears in the above-identified patent and that said Letters Patent is hereby corrected as shown below:

Please insert on Title page,

Item [30], Foreign Application Priority Data--Jul. 30, 1993  [JP].......... 5-189681--.

Signed and Sealed this

Twenty-first Day of October 1997

Attest:

BRUCE LEHMAN

Attesting Officer

Commissioner of Patents and Trademarks